United States Patent
Kiya

(10) Patent No.: US 8,037,960 B2
(45) Date of Patent: Oct. 18, 2011

(54) STRUCTURE FOR MOUNTING ELECTRICITY STORAGE PACK ON VEHICLE

(75) Inventor: Nobuaki Kiya, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 271 days.

(21) Appl. No.: 12/223,933

(22) PCT Filed: Feb. 26, 2007

(86) PCT No.: PCT/JP2007/054120
§ 371 (c)(1),
(2), (4) Date: Aug. 13, 2008

(87) PCT Pub. No.: WO2007/100118
PCT Pub. Date: Sep. 7, 2007

(65) Prior Publication Data
US 2009/0226806 A1  Sep. 10, 2009

(30) Foreign Application Priority Data

Feb. 28, 2006  (JP) .................................. 2006-053225

(51) Int. Cl.
*B60R 16/04* (2006.01)
(52) U.S. Cl. ..................................................... 180/68.5
(58) Field of Classification Search ................. 180/68.5; 403/2
See application file for complete search history.

(56) References Cited

U.S. PATENT DOCUMENTS

| | | | |
|---|---|---|---|
| 6,293,059 B1 * | 9/2001 | Goodwin ....................... 52/202 |
| 2006/0016633 A1 | 1/2006 | Fujii et al. | |
| 2009/0166116 A1 | 7/2009 | Kiya et al. | |

FOREIGN PATENT DOCUMENTS

| | | |
|---|---|---|
| JP | U-62-122731 | 8/1987 |
| JP | U-1-123976 | 8/1989 |
| JP | A-1-240383 | 9/1989 |
| JP | A 6-115361 | 4/1994 |
| JP | A 6-270694 | 9/1994 |
| JP | A 7-81431 | 3/1995 |
| JP | A-7-81432 | 3/1995 |
| JP | 07117490 A * | 5/1995 |
| JP | A 7-117490 | 5/1995 |

(Continued)

OTHER PUBLICATIONS

Japanese Patent Office, *Notice of Grounds of Rejection for Japanese Patent Application No. 2006-053225* (with English translation), May 10, 2011, pp. 1-5 (pp. 1-6 for translation).

*Primary Examiner* — J. Allen Shriver, II
*Assistant Examiner* — Bryan Evans
(74) *Attorney, Agent, or Firm* — Oliff & Berridge, PLC

(57) ABSTRACT

A structure for mounting a battery pack on a vehicle includes a mount for supporting the battery pack. The battery pack is fixed to an upper side of the mount by bolts. The battery pack is disposed on a rear side of a rear seat. The battery pack includes screw holes through which the bolts are inserted. The screw holes have closed shapes. The screw holes are long in a front-rear direction and formed so that the battery pack moves when an impact is applied on it. A fixed state of the battery pack by the bolts is canceled after movement of the battery pack.

2 Claims, 17 Drawing Sheets

FOREIGN PATENT DOCUMENTS

| | | |
|---|---|---|
| JP | A-8-133096 | 5/1996 |
| JP | A-2000-203460 | 7/2000 |
| JP | A-2001-171495 | 6/2001 |
| JP | A-2002-19474 | 1/2002 |
| JP | A 2003-45392 | 2/2003 |
| JP | 2003327155 A * | 11/2003 |
| JP | A 2003-327155 | 11/2003 |
| JP | A 2004-243847 | 9/2004 |
| JP | A 2004-262413 | 9/2004 |
| JP | 2005247063 A * | 9/2005 |
| JP | A 2005-247063 | 9/2005 |
| JP | 2006035915 A * | 2/2006 |
| JP | A 2006-35915 | 2/2006 |
| JP | A 2007-15600 | 1/2007 |
| JP | A 2007-203912 | 8/2007 |
| JP | A-2007-253933 | 10/2007 |
| WO | WO 2005/084985 A1 | 9/2005 |

* cited by examiner

STRUCTURE FOR MOUNTING ELECTRICITY STORAGE PACK ON VEHICLE

TECHNICAL FIELD

The present invention relates to a structure for mounting an electricity storage pack on a vehicle.

BACKGROUND ART

In recent years, an electric car using an electric motor as a driving source and a so-called hybrid electric car using a combination of an electric motor and another driving source are in the actual use. On such an automobile, an electricity storage device for supplying electricity as energy to the electric motor is mounted. As the electricity storage device, a secondary battery represented by a nickel-cadmium battery, a nickel-hydrogen battery, a lithium-ion battery, and the like or a capacitor that can be repeatedly charged and discharged is used. The electricity storage device is housed in a case and mounted on a vehicle body as an electricity storage pack.

There is a battery carrier support structure for an electric car as disclosed in Japanese Patent Laying-Open No. 6-270694, wherein a front bracket is fixed to a rocker by a bolt on an upper face of a front portion of a flange of a battery carrier and a rear bracket is fixed to the rocker by a bolt on an upper face of a rear portion of the flange of the battery carrier. In the battery carrier support structure, a lower wall portion of a rocker inner is formed at its middle portion in a front-rear direction of the vehicle with a bent bead. A rear portion of the rocker bends downward from the bent bead as a bend. A sliding load of the front bolt is smaller than that of the rear bolt. According to this battery carrier support structure, an energy absorbing burden on a front side member can be reduced, when an impact force is applied from a front side of the vehicle body.

There is a battery mounting structure as disclosed in Japanese Patent Laying-Open No. 2004-262413, wherein a plurality of elongated holes are formed in stays to which the batteries are coupled and which fix the batteries onto a floor panel to thereby form brittle portions on the stays. In the brittle portions, the strength only in the front-rear direction is reduced to a certain degree while the strength in the vertical direction is maintained. In this battery mounting structure, if the spare tire at the front of the vehicle body is struck up while guided by a slope in a collision and collides with rear portions of the batteries, the stays are deformed at their brittle portions. With this battery mounting structure, it is possible to prevent damage to the batteries due to the collision of the spare tire struck up in the collision. In place of the elongated holes formed in the stays, elongated holes having open rear ends may be formed in flanges to form slide mechanisms.

There is a battery frame fixing portion structure as disclosed in Japanese Patent Laying-Open No. 7-81431, wherein a side frame of a battery frame is fixed by a bolt and a nut plate and a front slit portion and a rear slit portion are formed on a front side and a rear side of an insertion hole for the bolt of a side member. A reinforcing member is inserted into the side member from a position corresponding to a rear portion of the side frame to a rear end of the side member. A front end of the reinforcing member is fixed to the side member by inserting the bolt into the insertion hole. A slit is formed at a rear portion of the insertion hole of the reinforcing member. With this battery frame fixing structure for an electric car, it is possible to suppress increase in weight of a vehicle body to prevent movement of the battery frame in a collision.

There is a battery support structure for an electric car as disclosed in Japanese Patent Laying-Open No. 7-117490, wherein a mounting hole is formed in a flange of a battery carrier and a bolt is inserted through the mounting hole. The battery carrier is mounted to the rocker by the bolt with a specific tightening force. A thin-walled portion is formed on the flange of the battery carrier to be adjacent to the mounting hole. With this battery support structure, it is possible to absorb kinetic energy of the battery carrier as well as to improve rigidity of a supporting portion of the battery carrier supported on a vehicle body.

There is a battery support structure for an electric car as disclosed in Japanese Patent Laying-Open No. 6-115361, wherein a plurality of holes not communicating with each other are formed in a flange of a battery carrier along a front-rear direction of a vehicle body. With this battery support structure for the electric car, it is possible to improve rigidity of a support portion of the battery carrier supported on the vehicle body and also to absorb kinetic energy of the battery carrier.

The electricity storage pack is fixed to a support member such as a floor panel and a side member for supporting the electricity storage pack. Disclosed in the above-described Patent Documents is the structure for mounting the electricity storage pack on the vehicle and for absorbing an amount of the impact when the impact is applied from the front-rear direction of the vehicle body. In the above-described Patent Documents, the member supporting the electricity storage pack bends or the bolts inserted through the holes formed at intervals break the portions between the insertion holes to thereby absorb energy of the impact of the collision or the like.

Here, if a small car bumps into the rear of a standard-sized car, the support member for the electricity storage pack is deformed. The impact is applied on the electricity storage pack through the support member. In other words, a secondary impact is applied on the electricity storage pack due to deformation of the support member.

On the other hand, in a case of an impact from an outside high position, the impact may be directly applied on the electricity storage pack. For example, if the electricity storage pack is disposed on a floor of a trunk room of the standard-sized car and a large truck bumps into the rear of the car, the large truck may directly apply an impact on the electricity storage pack. In this case, the electricity storage pack itself may be broken by grinding or crushing. If the impact is applied from the outside high position, the electricity storage pack cannot be sufficiently protected.

DISCLOSURE OF THE INVENTION

It is an object of the present invention to provide a structure for mounting an electricity storage pack on a vehicle and for suppressing damage to the electricity storage pack when an impact is applied on the electricity storage pack from an outside high position.

A structure for mounting an electricity storage pack on a vehicle according to the present invention includes a support member for supporting the electricity storage pack. The electricity storage pack is fixed to an upper side of the support member by a first screw. The electricity storage pack is disposed on a rear side of a rear seat in the vehicle. The electricity storage pack includes a first screw insertion hole through which the first screw is inserted. The first screw insertion hole has a closed shape. The first screw insertion hole includes: a first opening portion; a first opening portion disposed on a rear side of the first opening portion in the vehicle; and a connecting portion formed to connect the first opening portion and the second opening portion. The first opening portion is formed to be smaller than a head portion of the first screw. The second opening portion is formed to be larger than the head portion. The electricity storage pack is formed to move toward a front side of the vehicle due to movement of the first screw from the first opening portion to the second opening portion when an impact is applied on the electricity storage pack from a rear side of the vehicle. A fixed state of the electricity storage pack by the first screw is canceled by withdrawal of the first screw from the second opening portion.

In the above invention, the electricity storage pack preferably includes a step portion formed in a step shape. The first screw insertion hole is formed at the step portion. At least part of the second opening portion is formed at a higher portion than the first opening portion.

A structure for mounting an electricity storage pack on a vehicle according to the present invention includes a support member for supporting the electricity storage pack. The electricity storage pack is fixed to an upper side of the support member by a first screw. The electricity storage pack is disposed on a rear side of a rear seat in the vehicle. The electricity storage pack includes a first screw insertion hole through which the first screw is inserted. The first screw insertion hole has a closed shape. The first screw insertion hole includes: an opening portion; and a movement portion formed to extend from the opening portion toward a rear side of the vehicle. The electricity storage pack includes a thin-walled portion around an end portion of the movement portion. The thin-walled portion is formed to be thinner than a portion around the thin-walled portion. The electricity storage pack is formed to move toward a front side of the vehicle due to movement of the first screw from the opening portion along the movement portion when an impact is applied on the electricity storage pack from the rear side of the vehicle. A fixed state of the electricity storage pack by the first screw is canceled by breakage of the thin-walled portion by the first screw after the electricity storage pack moves toward the front side of the vehicle.

A structure for mounting an electricity storage pack on a vehicle according to the present invention includes a support member for supporting the electricity storage pack. The electricity storage pack is fixed to an upper side of the support member by a first screw. The electricity storage pack is disposed on a rear side of a rear seat in the vehicle. The electricity storage pack includes a first screw insertion hole through which the first screw is inserted. The first screw insertion hole has a closed shape. The electricity storage pack includes a thin-walled portion around the first screw insertion hole. The thin-walled portion is formed to be thinner than a portion around the thin-walled portion. The electricity storage pack is formed to move toward a front side of the vehicle due to tearing of the thin-walled portion by the first screw when an impact is applied on the electricity storage pack from the rear side of the vehicle. A fixed state of the electricity storage pack by the first screw is canceled by breakage of the thin-walled portion by the first screw after the electricity storage pack moves toward the front side of the vehicle.

In the above invention, the electricity storage pack preferably includes a case in which an electricity storage device is disposed. The case includes: a lower case on which the electricity storage device is placed; and an upper case formed to be fixed to the lower case and to cover the electricity storage device. The lower case and the upper case are fixed to each other by a third screw. The third screw is formed so as not to fix the electricity storage pack and the support member to each other.

A structure for mounting an electricity storage pack on a vehicle according to the present invention includes a support member for supporting the electricity storage pack. The electricity storage pack is fixed to an upper side of the support member by a second screw. The electricity storage pack is disposed on a rear side of a rear seat in the vehicle. The support member includes a second screw insertion hole in which the second screw is disposed. The support member includes a retainer formed to close at least part of the second screw insertion hole. The second screw is fixed to the retainer. The second screw insertion hole is formed so that the electricity storage pack moves toward a front side of the vehicle when an impact is applied on the electricity storage pack from a rear side of the vehicle. A fixed state of the support member and the electricity storage pack by the second screw is canceled by breakage of the retainer when the electricity storage pack moves toward the front side of the vehicle.

In the above invention, the retainer preferably has a breakage assisting portion formed around the second screw insertion hole. The breakage assisting portion has at least one of a notch portion and a hole portion.

A structure for mounting an electricity storage pack on a vehicle according to the present invention includes a support member for supporting the electricity storage pack. The electricity storage pack is fixed to an upper side of the support member by a first screw. The electricity storage pack is disposed on a rear side of a rear seat in the vehicle. The electricity storage pack includes a first screw insertion hole through which the first screw is inserted. The first screw insertion hole has a closed shape. The first screw insertion hole is formed so that the electricity storage pack moves toward a front side of the vehicle when an impact is applied on the electricity storage pack from a rear side of the vehicle. A fixed state of the support member and the electricity storage pack by the first screw is canceled after movement of the electricity storage pack toward the front side of the vehicle.

BEST MODES FOR CARRYING OUT THE INVENTION

Embodiment 1

With reference to FIGS. 1 to 12, a structure for mounting an electricity storage pack on a vehicle in an embodiment 1 according to the present invention will be described. In the structure for mounting on the vehicle in the present embodiment, an impact relaxation means for detaching the electricity storage pack when an impact from an outside high position is applied on the electricity storage pack is formed at the electricity storage pack.

An electricity storage device such as a secondary battery and a capacitor is housed in a case and mounted on an automobile. In the present invention, a device including the case and the electricity storage device housed in the case is referred to as an electricity storage pack. The electricity storage pack may include other inner component parts. Other inner component parts include cooling devices such as a cooling duct and a cooling fan for cooling the electricity storage device and an electric device for converting electric power, for example.

Figure 1:
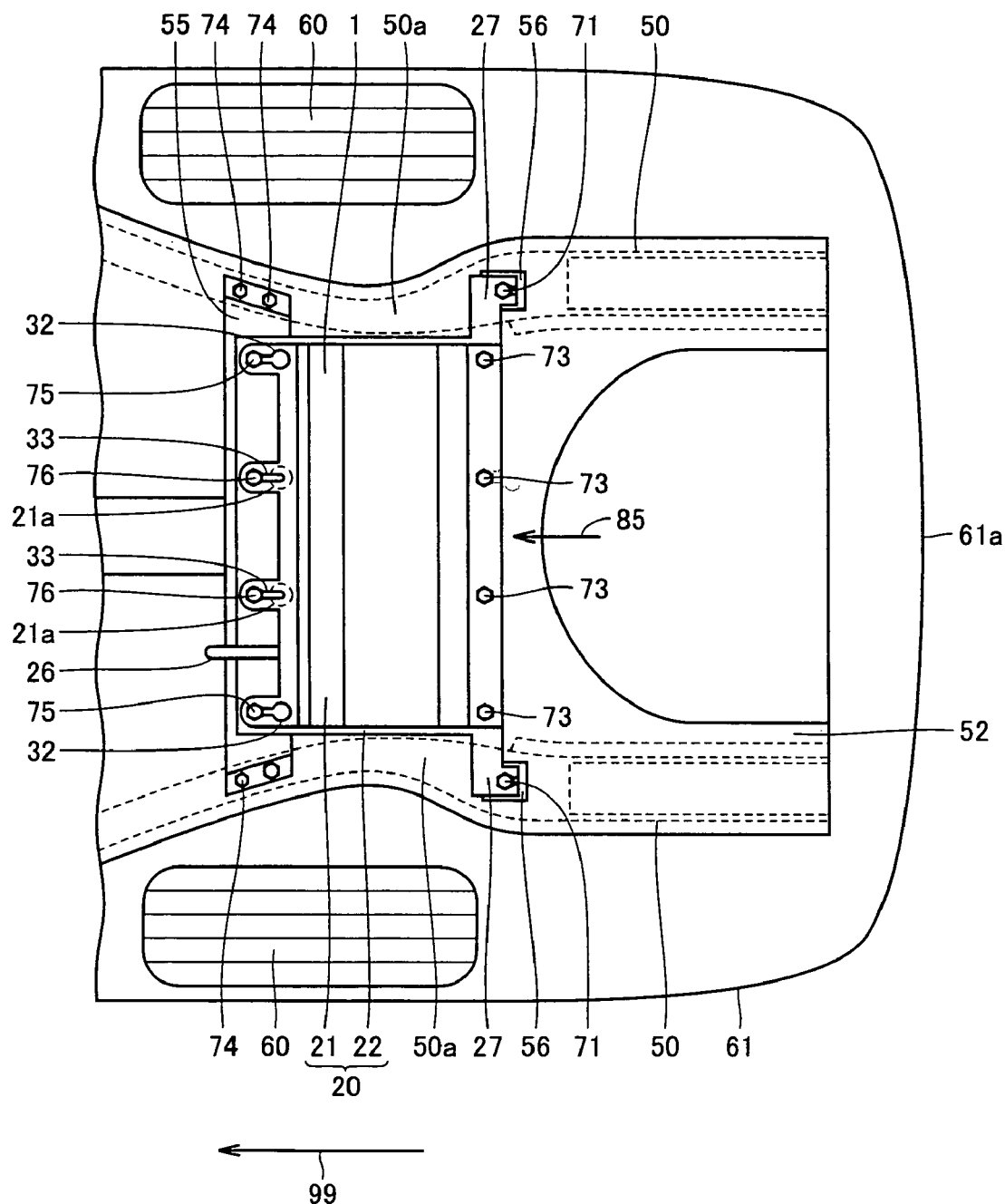
FIG. 1 is a first schematic sectional view of a battery pack portion in Embodiment 1.

FIG. 1 is a schematic sectional view of a battery pack portion in the present embodiment. FIG. 1 shows a rear portion of a vehicle body. An automobile in the present embodiment is a so-called sedan-type automobile. The automobile includes a body 61. Body 61 is formed in a substantially rectangular shape in a plan view. Body 61 has a rear face 61a. At a rear portion of a vehicle body, rear wheels 60 are disposed. An arrow 99 indicates a forward direction of the vehicle body.

In the present embodiment, battery pack 1 as the electricity storage pack is disposed in the rear portion of the vehicle body. Battery pack 1 includes a case 20. Inside case 20, a storage battery as the electricity storage device is disposed. Case 20 in the present embodiment is made or iron. Material of the case of the electricity storage device is not limited to iron but may be anything.

The automobile in the present embodiment includes support members formed to support battery pack 1. The support members include side members (side frames) 50. Side members 50 form parts of a main body of the vehicle body. Side members 50 are disposed on opposite sides in a width direction of the vehicle body. Side members 50 are formed to extend in a front-rear direction of the vehicle body.

On upper faces of side members 50, a floor member 52 is disposed. Floor member 52 is formed in a plate shape. Floor member 52 is disposed astride an area between side members 50 disposed on opposite sides in the width direction of the vehicle body. Mounts 55, 56 are disposed on a surface of the floor member 52.

A front end portion of battery pack 1 is supported on side members 50 with mount 55 and floor member 52 interposed therebetween. A rear end portion of battery pack 1 is supported on side members 50 with mounts 56 and floor member 52 interposed therebetween.

In the present embodiment, respective members are fixed by using bolts out of screws. As a fixing structure of the bolt, a nut may be used or a screw hole in a member on an opposite side to a head portion of the bolt may be threaded.

At the front end portion of battery pack 1, battery pack 1 is fixed to mount 55 by bolts 75, 76 as first screws. Mount 55 is formed to extend in the width direction of the vehicle body. Mount 55 is formed to connect two side members 50 like a bridge. Mount 55 is fixed to side members 50 by bolts 74.

At the rear end portion of battery pack 1, leg portions 27 of battery pack 1 are fixed to mounts 56 by bolts 71. Leg portions 27 are formed on opposite sides in the width direction at the rear end portion of battery pack 1. Leg portions 27 extend from a main body of battery pack 1 to positions above side members 50. Leg portions 27 in the present embodiment are formed so that their longitudinal directions are substantially parallel to the width direction of the vehicle body.

Figure 2:
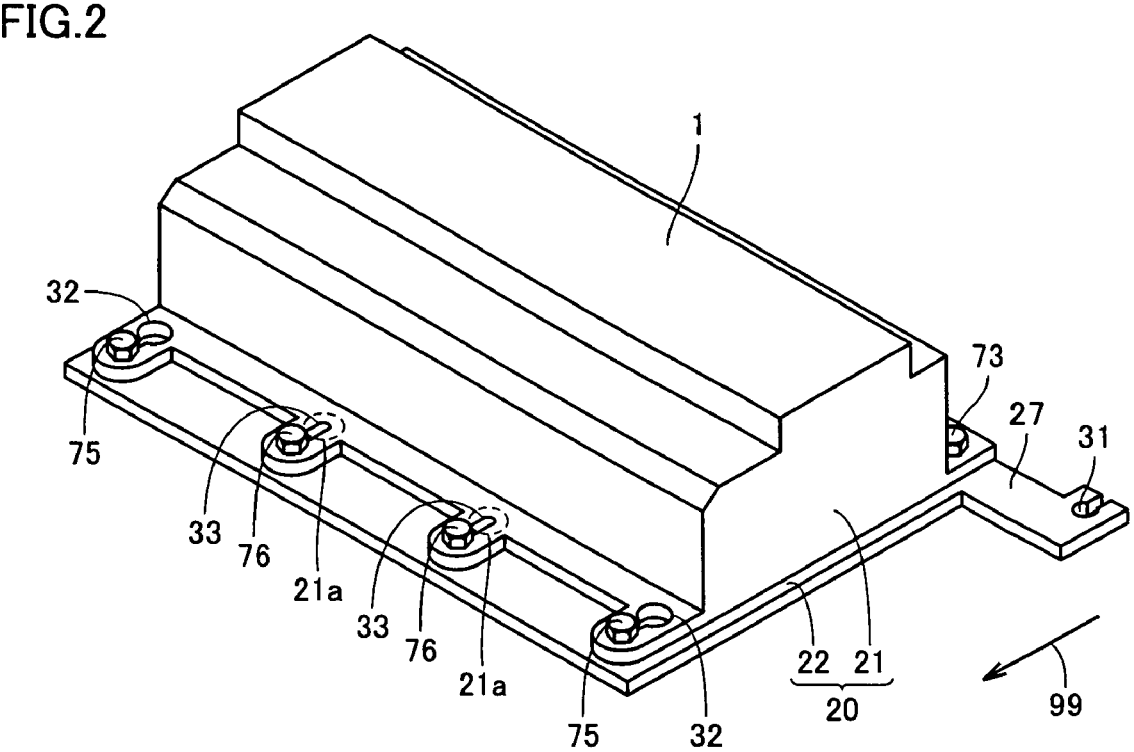
FIG. 2 is a schematic perspective view of the battery pack in Embodiment 1.
Figure 3:
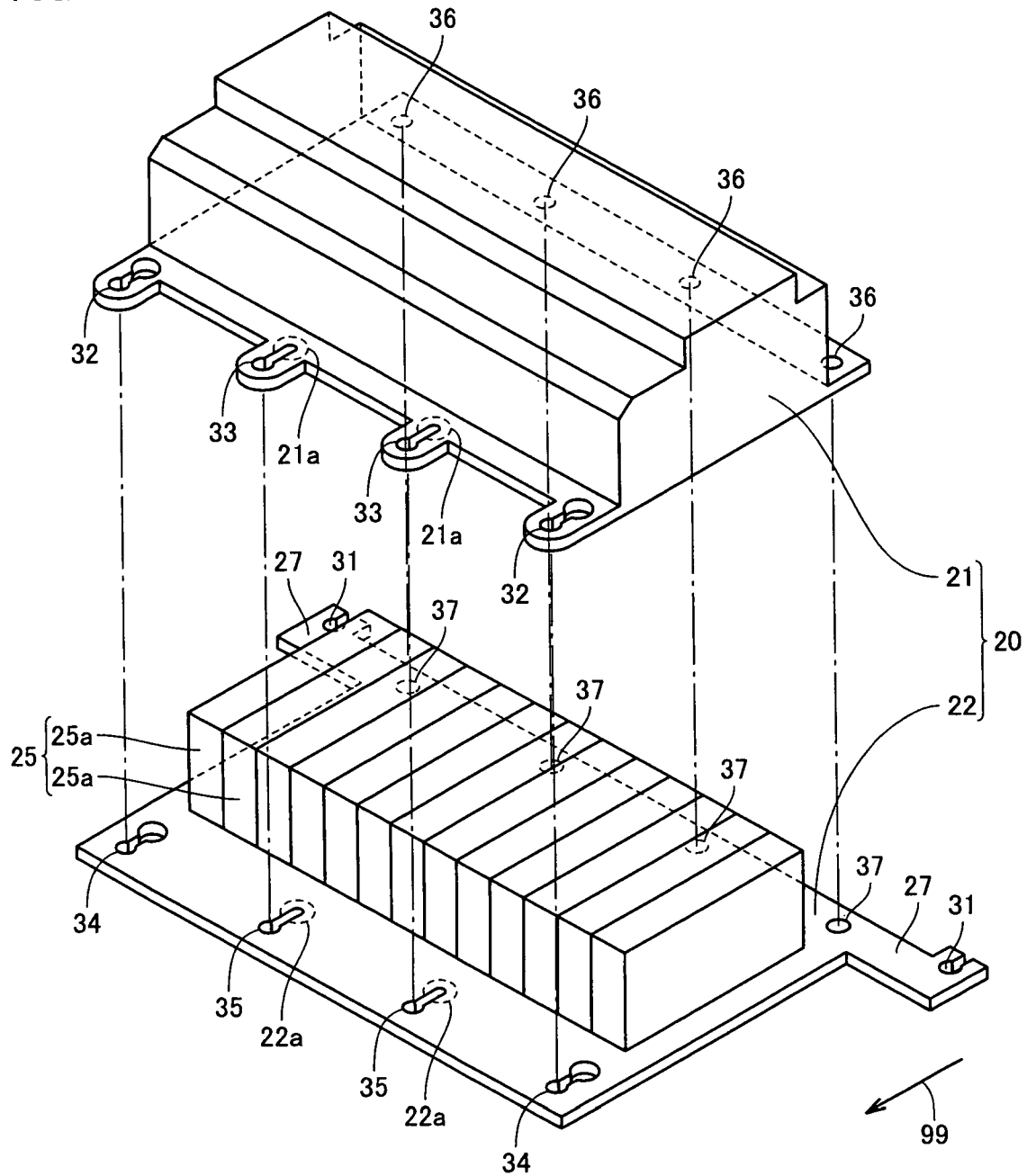
FIG. 3 is a schematic exploded perspective view of the battery pack in Embodiment 1.

FIG. 2 is a schematic perspective view of the battery pack in the present embodiment. FIG. 3 is an exploded perspective view of the battery pack in the present embodiment. Case 20 of battery pack 1 is formed in a box shape. Case 20 includes an upper case 21 and a lower case 22. Lower case 22 has leg portions 27. Each of leg portions 27 has a screw hole 31 at its outer end portion.

On an upper face of lower case 22, storage battery 25 as the electricity storage device is disposed. Storage battery 25 in the present embodiment includes a plurality of battery cells 25a. Battery cells 25a are arranged into a laminated structure. Upper case 21 is formed to cover storage battery 25.

With reference to FIGS. 1 to 3, upper case 21 has screw holes 32, 33 at its front end portion. Lower case 22 has screw holes 34, 35 at its front end portion. Screw holes 32 and screw holes 34 are formed in positions corresponding to each other. Screw holes 33 and screw holes 35 are formed in positions corresponding to each other. In the present embodiment, screw holes 32 and screw holes 34 form one first screw insertion holes of battery pack 1. First screw insertion holes are formed at opposite end portions in the width direction. Screw holes 33 and screw holes 35 form the other first screw insertion holes of battery pack 1. The other first screw insertion holes are formed at a substantially central portion in the width direction.

By disposing bolts 75 in screw holes 32, 34, upper case 21 and lower case 22 are fixed to each other and battery pack 1 is fixed onto mount 55. By disposing bolts 76 in screw holes 33, 35, upper case 21 and lower case 22 are fixed to each other and battery pack 1 is fixed onto mount 55.

Upper case 21 has screw holes 36 at its rear end portion. Lower case 22 has screw holes 37 corresponding to screw holes 36 at its rear end portion. By disposing bolts 73 as third screws in screw holes 36 and screw holes 37, upper case 21 and lower case 22 are fixed to each other. Bolts 73 do not fix battery pack 1 and side members 50.

Figure 4:
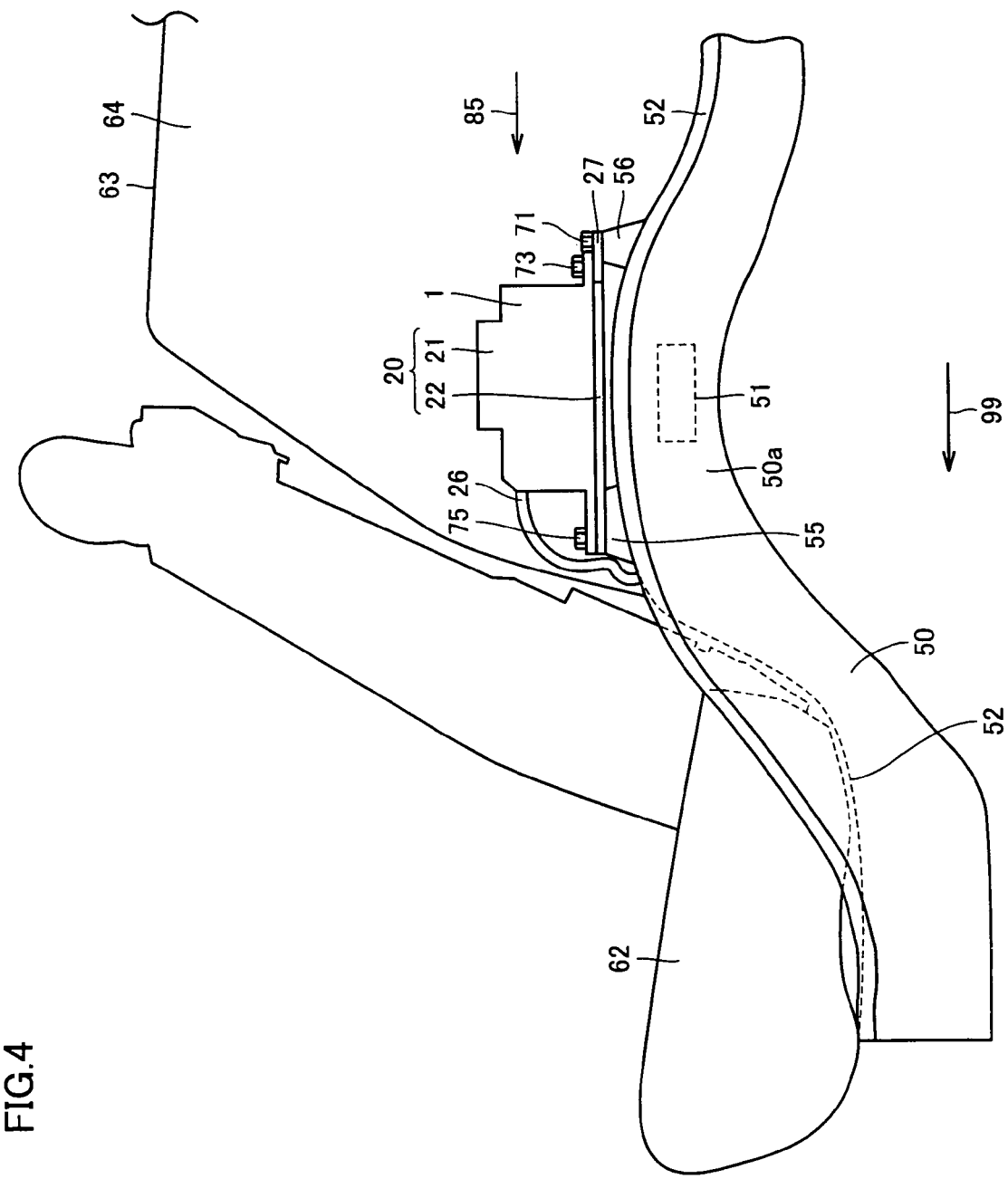
FIG. 4 is a second schematic sectional view of the portion of the battery pack in Embodiment 1.

FIG. 4 is a second schematic sectional view of the structure for mounting the battery pack to the vehicle in the present embodiment. FIG. 4 is a schematic sectional view when the vehicle body is cut along a plane extending in a vertical direction. Behind a rear seat 62, a partition panel 63 is disposed. Partition panel 63 divides a cabin and a trunk room 64 from each other. Battery pack 1 in the present embodiment is disposed in trunk room 64. Battery pack 1 is disposed on upper faces of mounts 55, 56. Battery pack 1 is disposed behind rear seat 62.

Side members 50 have kick up portions 50a formed to bulge upward. Battery pack 1 is disposed on kick up portions 50a. Battery pack 1 is supported to be substantially horizontal when viewed from sides.

The automobile in the present embodiment includes a conductor wire 26 electrically connected to battery pack 1. Conductor wire 26 has such a length that it bends even after a fixed state of battery pack 1 to side members 50 is canceled.

Figure 5:
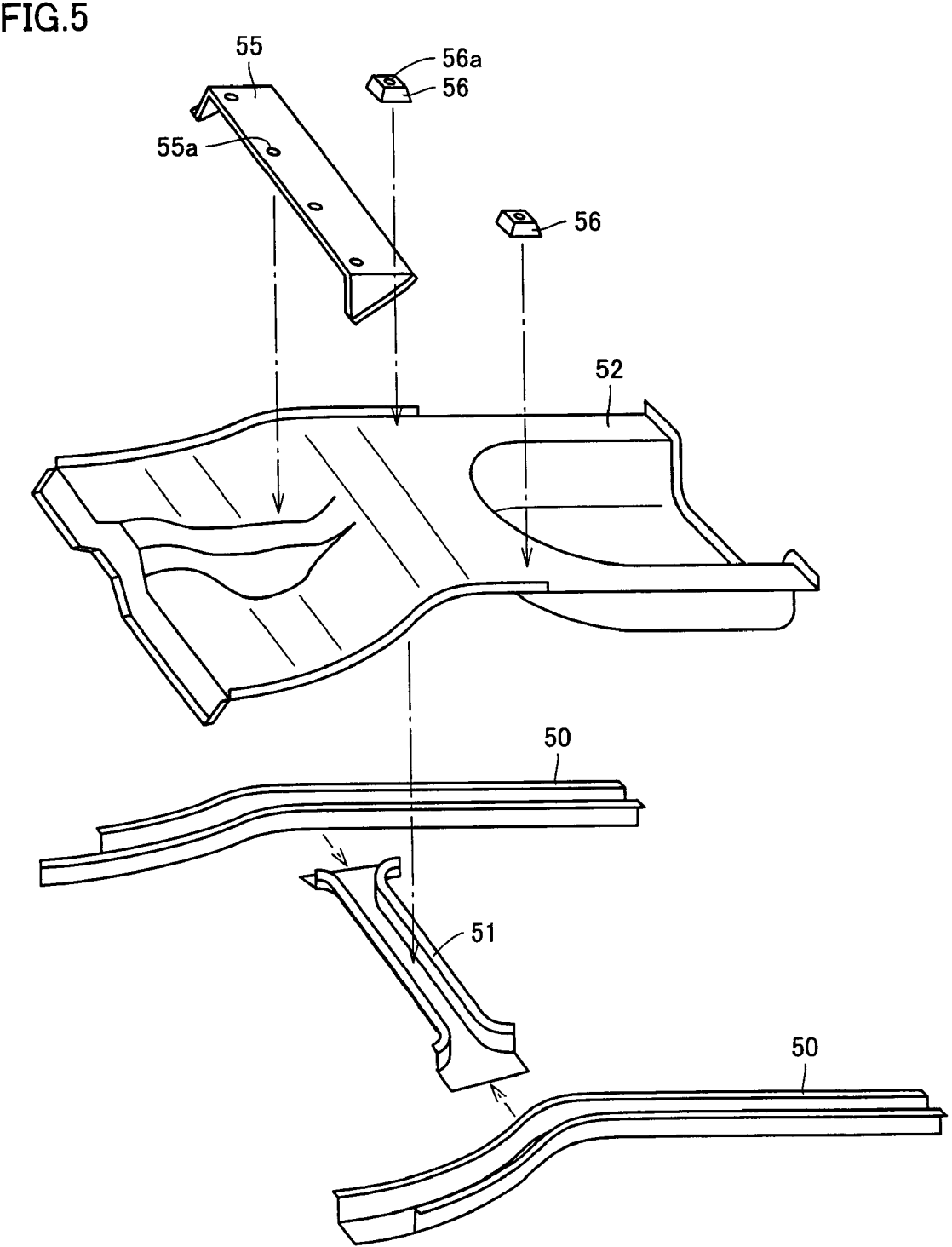
FIG. 5 is a schematic exploded perspective view of support members in Embodiment 1.

FIG. 5 is a schematic exploded perspective view of the support members in the present embodiment. The support members in the present embodiment include side members 50, a cross member 51, and floor member 52. Cross member 51 is formed to fix side members 50 to each other. Floor member 52 is formed in a plate shape. Floor member 52 is disposed on upper faces of side members 50 and cross member 51.

The support members in the present embodiment include mounts 55, 56. Mounts 55, 56 are fixed onto an upper face of floor member 52. Mount 55 has screw insertion holes 55a formed to fix screws. Mounts 56 have screw insertion holes 56a formed to fix screws.

In the present embodiment, side members 50 are fixed to cross member 51 by welding. Floor member 52 is fixed to side members 50 by welding. Mounts 55, 56 are fixed to floor member 52 by welding.

Figure 6:
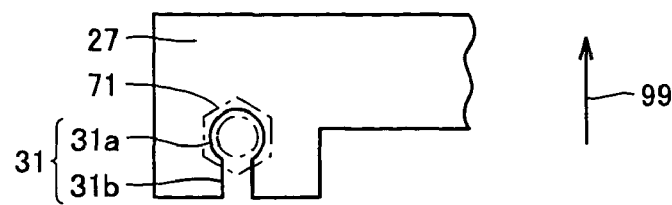
FIG. 6 is an enlarged schematic plan view of a leg portion of a lower case in Embodiment 1.

FIG. 6 is an enlarged schematic plan view of a leg portion of battery pack in the present embodiment. At a tip end of leg portion 27, a screw hole 31 into which bolt 71 is to be inserted is formed. Screw hole 31 has an opening portion 31a and a movement portion 31b. Battery pack is fixed to the vehicle body with shafts (threaded rod-shaped portions) of bolts 71 disposed in opening portions 31a.

Opening portion 31a has a circular planar shape. Opening portion 31a has a larger diameter than the shaft of bolt 71. Opening portion 31a has a smaller diameter than a head portion (e.g., a portion in a shape of a hexagonal column) of bolt 71. Movement portion 31b is formed to extend toward the rear side of the vehicle body. Movement portion 31b is formed in a straight shape. Movement portion 31b has a width smaller than the diameter of the shaft of bolt 71.

Figure 7:
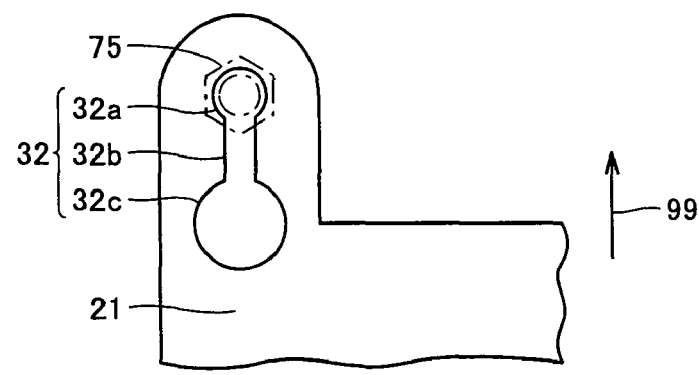
FIG. 7 is a first enlarged schematic plan view of a front portion of the battery pack in Embodiment 1.

FIG. 7 is a first enlarged schematic plan view of a front portion of the battery pack in the present embodiment. Each of screw holes 32 of upper case 21 has an opening portion 32a, a connecting portion 32b, and an opening portion 32c. A longitudinal direction of screw hole 32 is parallel to the front-rear direction of the vehicle body. Screw hole 32 is formed to extend in the front-rear direction of the vehicle body. Opening portion 32c is disposed on a side of opening portion 32a opposite to a side to which battery pack 1 moves when an impact is applied. Opening portion 32c is disposed behind opening portion 32a.

Screw hole 32 has a closed shape. Any portion of screw hole 32 does not communicate with an outside of the battery pack. Screw holes 34 of lower case are formed in substantially the same shapes as screw holes 32 (see FIG. 3).

Opening portion 32a has a larger diameter than a shaft of bolt 75. Connecting portion 32b has a width smaller than a diameter of the shaft of bolt 75. When the battery pack is fixed to the vehicle body, the shaft of bolt 75 is disposed in opening portion 32a.

Figure 8:
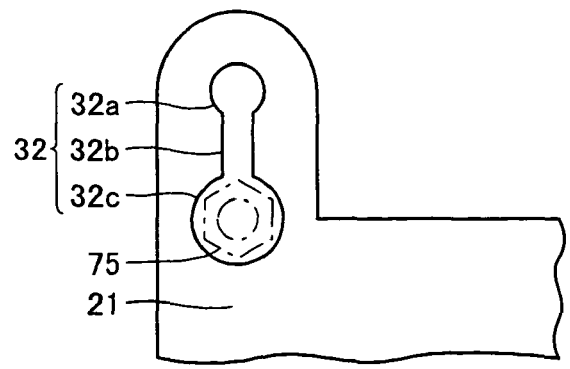
FIG. 8 is a second enlarged schematic plan view of the front portion of the battery pack in Embodiment 1.

FIG. 8 is a second enlarged schematic plan view of the front portion of the battery pack in the present embodiment. Opening portion 32c of screw hole 32 has a larger diameter than a head portion of bolt 75. The opening portion 32c is formed so that bolt 75 can pass through it.

Figure 9:
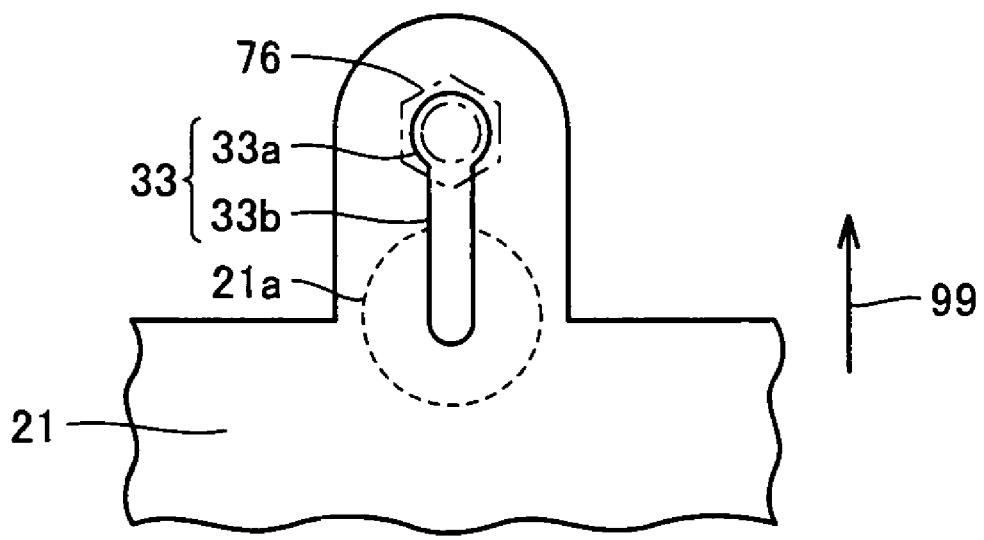
FIG. 9 is a third enlarged schematic plan view of the front portion of the battery pack in Embodiment 1

FIG. 9 is a third enlarged schematic plan view of the front portion of the battery pack in the present embodiment. Each of screw holes 33 of upper case 21 of the battery pack has an opening portion 33a and a movement portion 33b. A longitudinal direction of the screw hole 33 is parallel to the front-rear direction of the vehicle body.

Opening portion 33a has a larger diameter than a shaft of bolt 76. Opening portion 33a has the smaller diameter than a head portion of bolt 76. When the battery pack is fixed to the vehicle body, the shaft of bolt 76 is disposed in opening portion 33a.

Figure 10:
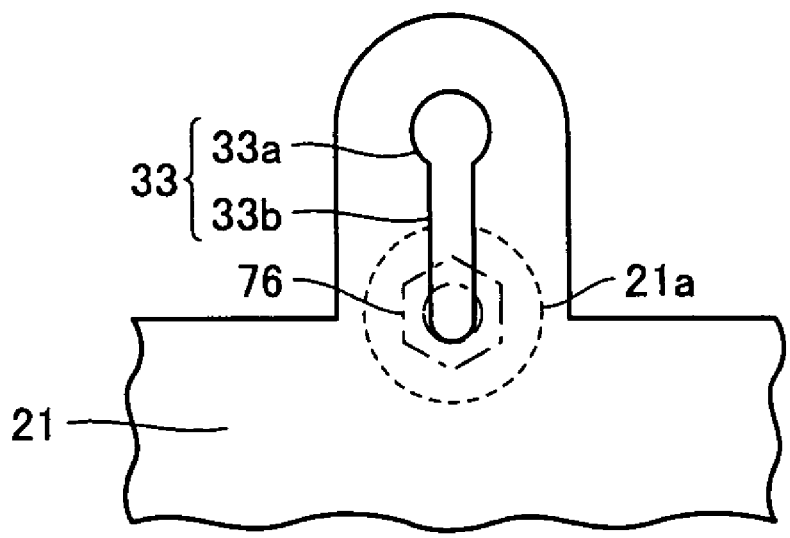
FIG. 10 is a fourth enlarged schematic plan view of the front portion of the battery pack in Embodiment 1

FIG. 10 is a fourth enlarged schematic plan view of the front portion of the battery pack in the present embodiment. The movement portion 33b is formed to have a width smaller than a diameter of the shaft of bolt 76. Movement portion 33b is formed to extend in the front-rear direction of the vehicle body.

Screw hole 33 has a closed shape. Any portion of screw hole 33 does not communicate with the outside of the battery pack. Screw holes 35 of the lower case are formed in substantially the same shapes as screw holes 33 (see FIG. 3).

With reference to FIGS. 1 to 3, 9, and 10, upper case 21 in the present embodiment has thin-walled portions 21a. Each of thin-walled portions 21a is formed to be thinner than a portion around it. In the present embodiment, thin-walled portion 21a is formed to surround an end portion of movement portion 33b of screw hole 33.

Each of thin-walled portions 21a in the present embodiment has a larger diameter than the head portion of bolt 76 when the shaft of bolt 76 is disposed in the end portion of movement portion 33b. In other words, the thin-walled portion 21a is formed to be larger than the head portion of bolt 76 in a plan view. Thin-walled portion 21a is broken by the head portion of the bolt due to the impact applied on the battery pack.

With reference to FIG. 3, similarly to upper case 21, lower case 22 has thin-walled portions 22a around screw holes 35. Thin-walled portions 22a are formed in shapes corresponding to shapes of thin-walled portions 21a of upper case 21. Thin-walled portions 22a have substantially the same shapes as thin-walled portions 21a of upper case 21.

With reference to FIG. 4, in the present embodiment, an assumption is made that an impact from an outside high position is applied on battery pack 1 as shown by an arrow 85. For example, an assumption is made that a large truck bumps into the rear of the automobile in the present embodiment. The large truck may have a bumper disposed in a higher position than the upper face of floor member 52 in some cases. In such a case, the impact is directly applied to battery pack 1.

With reference to FIGS. 1 to 3, if the impact from the outside high position is applied, battery pack 1 moves toward a front side of the vehicle body as shown by arrow 99. On the other hand, mounts 55, 56 fixed to side members 50 do not move. In other words, bolts 74 do not move. Moreover, bolts 71, 75, 76 fixed to mounts 55, 56 do not move.

With reference to FIGS. 1, 2, and 6, at the rear end portion of battery pack 1, leg portions 27 move toward the front side of the vehicle body as shown by arrow 99. At this time, movement portion 31b of screw hole 31 of each leg portion 27 is widened by the shaft of bolt 71. Bolt 71 withdraws from screw hole 31. In other words, the fixed state by bolt 71 is canceled.

With reference to FIGS. 1, 2, and 7, in screw holes 32 on the front side of battery pack 1, battery pack 1 moves in the direction of arrow 99. Connecting portion 32*b* of each screw hole 32 is widened by the shaft of bolt 75. As shown in FIG. 8, bolt 75 moves to opening portion 32*c*. Because opening portion 32*c* is formed to be larger than the head portion of bolt 75, bolt 75 passes through opening portion 32*c*.

With reference to FIGS. 1, 2, and 9, in screw holes 33 on the front side of battery pack 1, battery pack 1 moves in the direction shown by arrow 99. Movement portion 33*b* of each screw hole 33 is widened by the shaft of bolt 76. As shown in FIG. 10, bolt 76 moves substantially to the end portion of movement portion 33*b*. Bolt 76 moves to an inside of the area where thin-walled portion 21*a* is formed.

Figure 11:
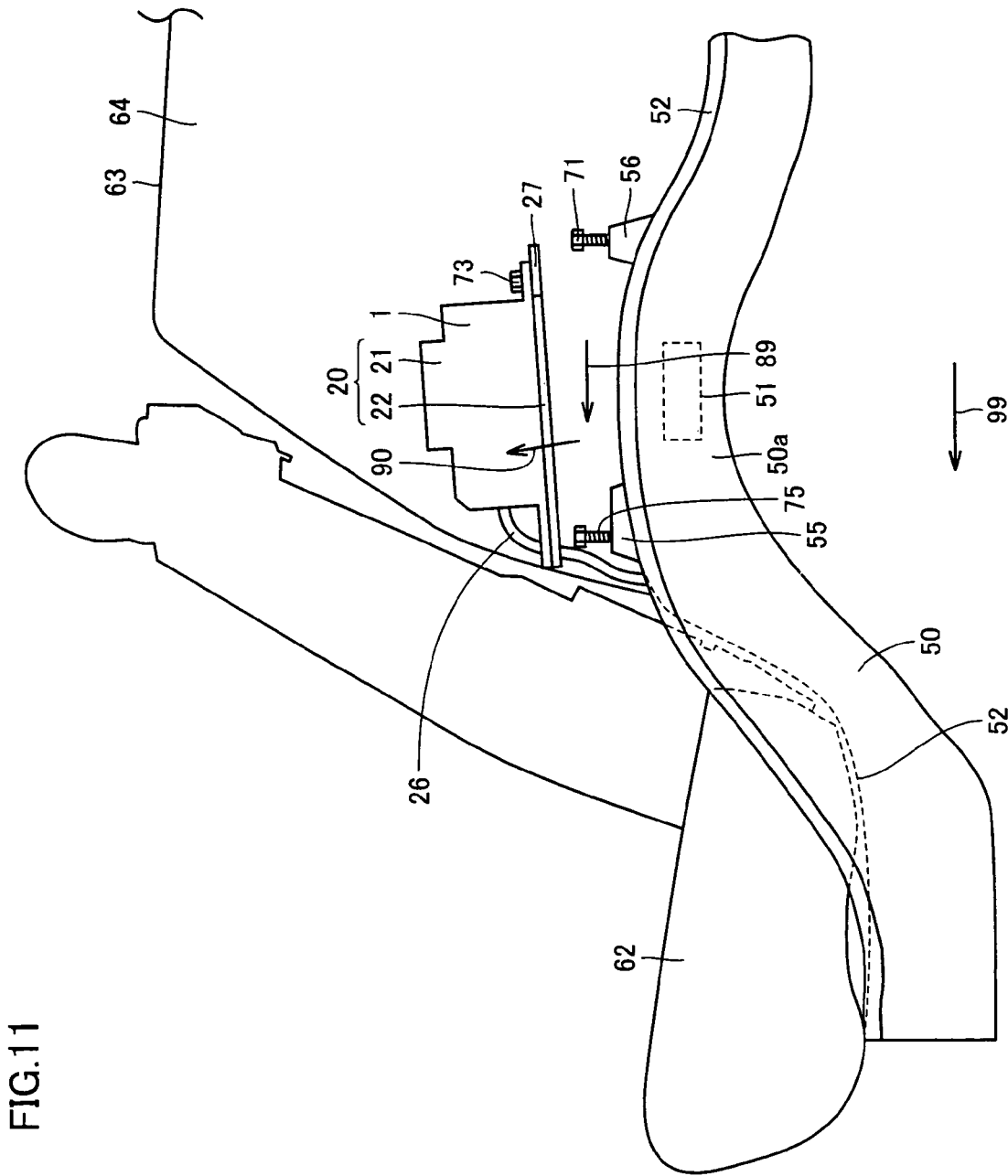
FIG. 11 is a third schematic sectional view of the portion of the battery pack in Embodiment 1.

FIG. 11 is a schematic sectional view of the battery pack on which the impact from the outside high position is applied. FIG. 11 is a schematic sectional view corresponding to FIG. 4. Battery pack 1 moves substantially horizontally as shown by an arrow 89 and then moves substantially vertically as shown by an arrow 90.

At this time, with reference to FIGS. 1, 2, and 6 to 10, bolts 71 separate from leg portions 27. Bolts 75 withdraw from opening portions 32*c* of screw holes 32. Bolts 76 withdraw from case 20 while breaking thin-walled portions 21*a* formed at upper case 21 and thin-walled portions 22*a* formed at lower case 22.

With reference to FIG. 11, upper case 21 and lower case 22 are maintained in the fixed state to each other by bolts 73. When battery pack 1 is detached from mounts 55, 56, energy of the impact is absorbed and damage to battery pack 1 can be suppressed. In the present embodiment, because battery pack 1 is disposed in trunk room 1, it is possible to prevent battery pack 1 from entering the cabin.

Conductor wire 26 in the present embodiment has the enough length to bend after battery pack 1 is detached from mounts 55, 56. With this structure, it is possible to reduce a possibility of a break of conductor wire 26 when the impact from the outside high position is applied.

In the structure for mounting the battery pack on the vehicle in the present embodiment, the battery pack is detached from the support members when the impact from the outside high position is applied on the battery pack. Therefore, it is possible to reduce a possibility that the battery pack is broken while remaining fixed to the support members. It is possible to reduce a possibility that the battery pack is broken by grinding or crushed while fixed to the support members. By detaching the battery pack from the support members, it is possible to absorb part of energy of the impact on the battery to thereby suppress damage to the battery pack.

On the other hand, when the impact applied on the battery pack from the outside high position is small, the battery pack is fixed to the support members so as not to move. For example, if a small car bumps into the rear of the automobile to apply such a degree of impact as to deform the side members, the battery pack is fixed so as not to be detached. In a case of an impact applied when the automobile collides with a building and a heavy object placed in the trunk room collides with the battery pack, the battery pack is fixed so as not to be detached.

Bolts 75, 76, and 71 determine tightening torque according to magnitude of the impact on the battery pack from the predetermined outside high position. The width of movement portion 31*b* of screw hole 31 formed in each leg portion 27, the width of connecting portion 32*b* of each screw hole 32 formed at the front portion of the case, and the width of movement portion 33*b* of each screw hole 33 formed at the front portion of the case are set according to magnitude of the impact from the outside high position at which the battery pack 1 should be moved. Movement portions 31*b*, 33*b*, and connecting portion 32*b* may be formed to have widths larger than the diameters of the shafts of the bolts.

With reference to FIGS. 1 to 3 and 7 to 10, in battery pack 1 in the present embodiment, case 20 is formed with screw holes 32, 34 as one first screw insertion holes. Each of screw holes 32, 34 has a first opening portion formed on the front side, a second opening portion formed on the rear side, and a connecting portion formed to connect the first opening portion and the second opening portion. The battery pack in the present embodiment is formed with screw holes 33, 35 as the other first screw insertion holes and thin-walled portions 21*a*, 22*a* are formed around screw holes 33, 35. With either one of the structures, it is possible to provide a fixing mechanism for detaching the battery pack from the side members when the impact from the outside high position is applied.

Although the first screw insertion holes each having the first opening portion and the second opening portion or the first screw insertion holes each having the opening portion, the movement portion, and the thin-walled portion around the tip end of the movement portion are formed in the present embodiment, not both of the structures but either one of them may be employed.

Furthermore, each of the first screw insertion holes is not limited to the above form. It is essential only that the fixed state by the first screw is canceled after movement of the battery pack. For example, the first insertion hole may include an opening portion having a circular planar shape and a thin-walled portion may be formed around the opening portion.

Figure 12:
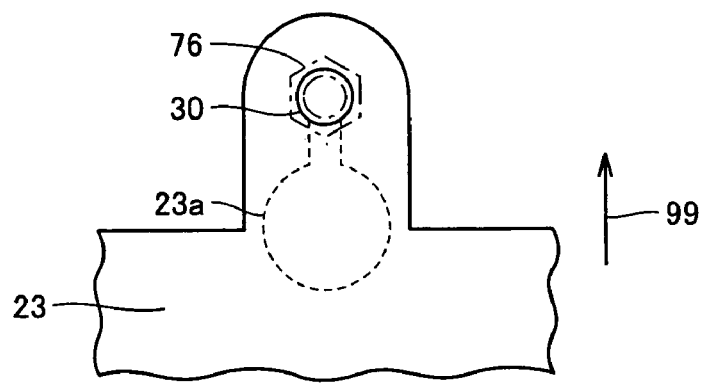
FIG. 12 is an enlarged schematic plan view of a front portion of the other battery pack in Embodiment 1.

FIG. 12 is a schematic plan view of a front portion of the other battery pack in the present embodiment. In the battery pack, a thin-walled portion is formed around each of the first screw insertion holes. The battery pack includes an upper case 23. Upper case 23 includes screw holes 30 as the first screw insertion holes. Each screw hole 30 has a circular planar shape. Upper case 23 includes thin-walled portion 23*a*. Thin-walled portion 23*a* has a shifting area for shifting of bolt 76 as the first screw and extending in the front-rear direction of the vehicle and a breakage area for withdrawal of bolt 76 from the battery case. The breakage area in the present embodiment has a circular planar shape. A width of the shifting area is smaller than a diameter of the shaft of bolt 76. Breakage area is formed to be larger than the head portion of bolt 76.

In the other battery pack in the present embodiment, when the impact from the outside high position is applied on the battery pack, the battery pack moves toward the front side of the vehicle and the shifting area of thin-walled portion 23*a* is torn by bolt 76. Then, the breakage area of thin-walled portion 23*a* is broken by bolt 76 and, as a result, the fixed state of the battery pack by bolt 76 is canceled.

Although each of the leg portions on the rear side of the electricity storage pack is formed with a screw hole having the so-called open shape partially communicating with the outside in the present embodiment, this is not an absolute necessity. It is also possible to employ any structure with which the fixed state is canceled when the impact from the outside high position is applied on the battery pack. For example, the leg portion itself of the electricity storage pack may be broken when force of the impact of predetermined or greater magnitude is applied.

Although the first screw insertion holes in the present embodiment are formed on the front side of the battery pack, they do not necessarily have to be formed on this side but may be formed on any side. For example, the first screw insertion holes may be formed on sides of the electricity storage pack. It is preferable that the screw holes such as the first screw insertion holes extend substantially parallel to a direction in which application of the impact is expected.

Embodiment 2

Figure 13:
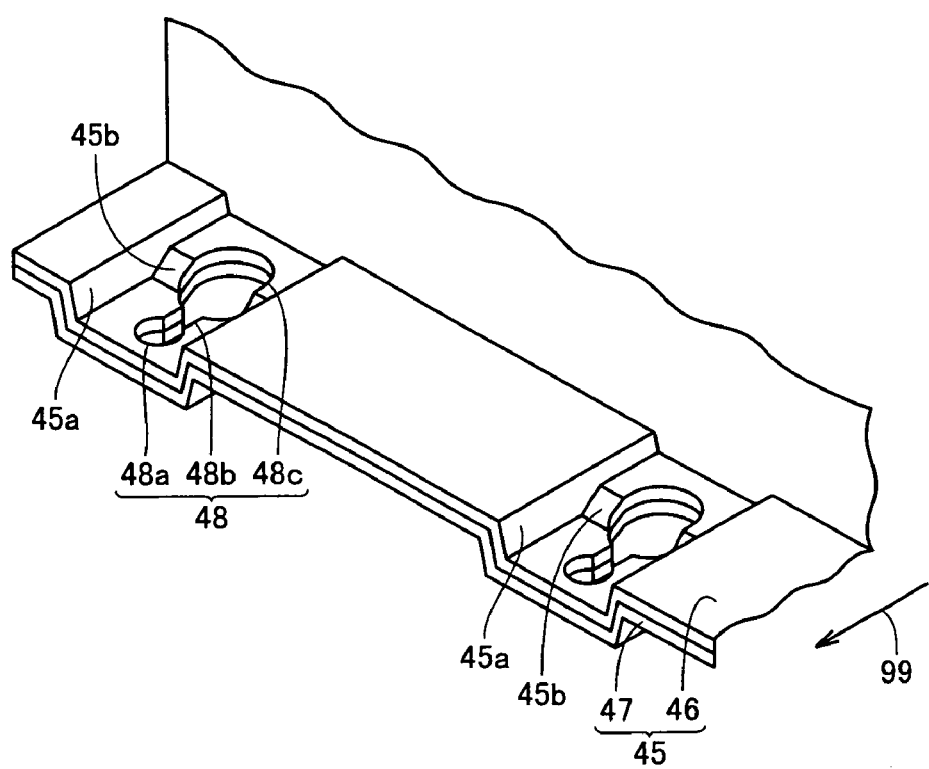
FIG. 13 is an enlarged schematic perspective view of a front portion of a battery pack in an embodiment 2.
Figure 14A:
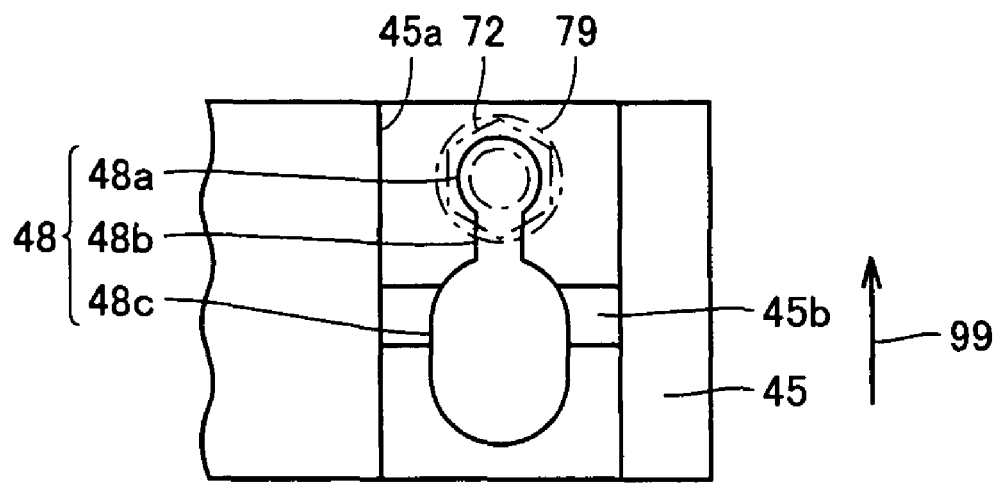
FIG. 14A is a first enlarged schematic plan view of the front portion of the battery pack in Embodiment 2.
Figure 14B:
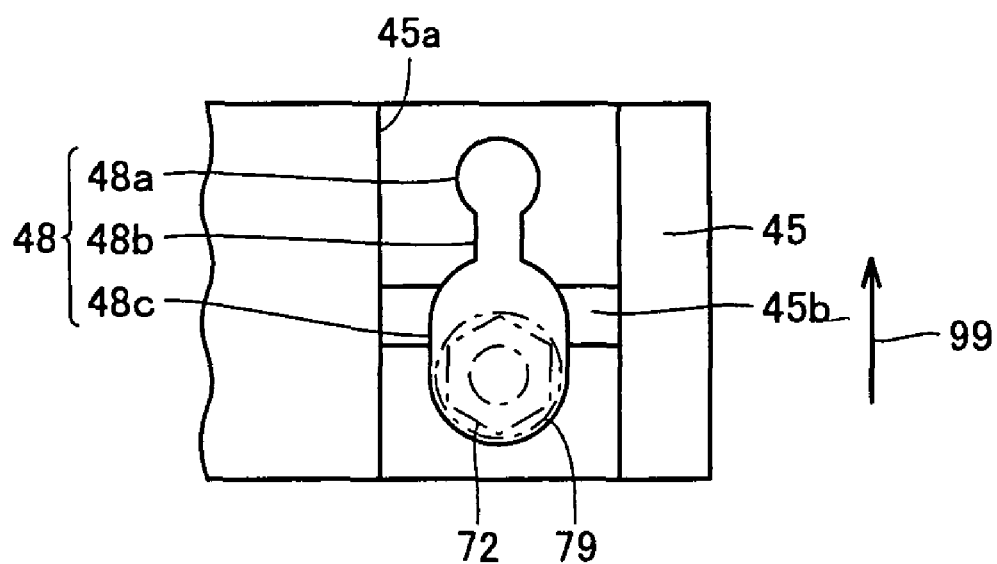
FIG. 14B is a second enlarged schematic plan view of the front portion of the battery pack in Embodiment 2.

With reference to FIGS. 13, 14A, and 14B, a structure for mounting an electricity storage pack on a vehicle in an embodiment 2 according to the present invention will be described. The structure for mounting the electricity storage pack on the vehicle in the present embodiment is different from Embodiment 1 in structures of portions of a front end portion of the electricity storage pack to be fixed by screws.

FIG. 13 is a schematic perspective view of a front portion of the battery pack in the present embodiment. An arrow 99 indicates a forward direction of the vehicle body. The battery pack in the present embodiment includes a case 45. Case 45 has an upper case 46 and a lower case 47. Case 45 has recessed portions 45a at its front end portion. Recessed portions 45a are respectively formed at portions where bolts are to be disposed.

At a bottom portion of each recessed portion 45a, a step portion 45b is formed. Step portion 45b is formed to have a step-like sectional shape. Step portion 45b is formed to be higher on the rear side. A bottom face of each recessed portion 45a is formed with a screw hole 48 as a first screw insertion hole. Screw hole 48 is formed to be long in the front-rear direction of the vehicle body. Screw hole 48 is formed to extend in the direction of the expected impact.

FIG. 14A is a first enlarged schematic plan view of the front portion of the battery pack in the present embodiment. Screw hole 48 includes an opening portion 48a formed as a first opening portion on the front side and an opening portion 48c formed as the second opening portion on the rear side. Screw hole 48 has a connecting portion 48b formed to connect opening portion 48a and opening portion 48c.

Opening portion 48c is formed at step portion 45b. Opening portion 48c is formed astride step portion 45b. At least part of opening portion 78c is formed in a higher position than opening portion 48a. Opening portion 48a is formed so that a shaft of a bolt 72 can pass through it. Opening portion 48a is formed so that a head portion of bolt 72 cannot pass through it.

FIG. 14B is a second enlarged schematic plan view of the front portion of the battery pack in the present embodiment. Opening portion 48c is formed so that the head portion of bolt 72 can pass through it. Furthermore, in the present embodiment, a washer 79 is used for fixing. A width of opening portion 48c is larger than a diameter of washer 79. In other words, opening portion 48c is formed so that washer 79 can pass through it.

With reference to FIG. 14A, in the structure for mounting the battery pack on the vehicle in the present embodiment, the battery pack moves in the direction shown by arrow 99 when the impact from the outside high position is applied on the battery pack from behind. The battery pack moves substantially horizontally.

With reference to FIG. 14B, in a plan view, bolt 72 and washer 79 are disposed inside opening portion 48c. Bolt 72 and washer 79 can pass through opening portion 48c. Parts of bolt 72 and washer 79 are disposed on a back side of case 45 and separated from case 45. In this way, in the present embodiment, it is possible to cancel the fixed state by the bolt more reliably when the battery pack moves.

Although the step portion in the present embodiment is formed in the step shape, the step portion is not limited to this shape. It is essential only that at least part of the second opening portion be disposed in a higher position than the first opening portion. For example, the step portion may have a mountain-like sectional shape without an edge and an opening portion through which the head portion of the screw can pass may be formed at a top portion of the mountain.

Because other structures, operations, and effects are the same as those of Embodiment 1, they will not be repeatedly described here.

Embodiment 3

Figure 15:
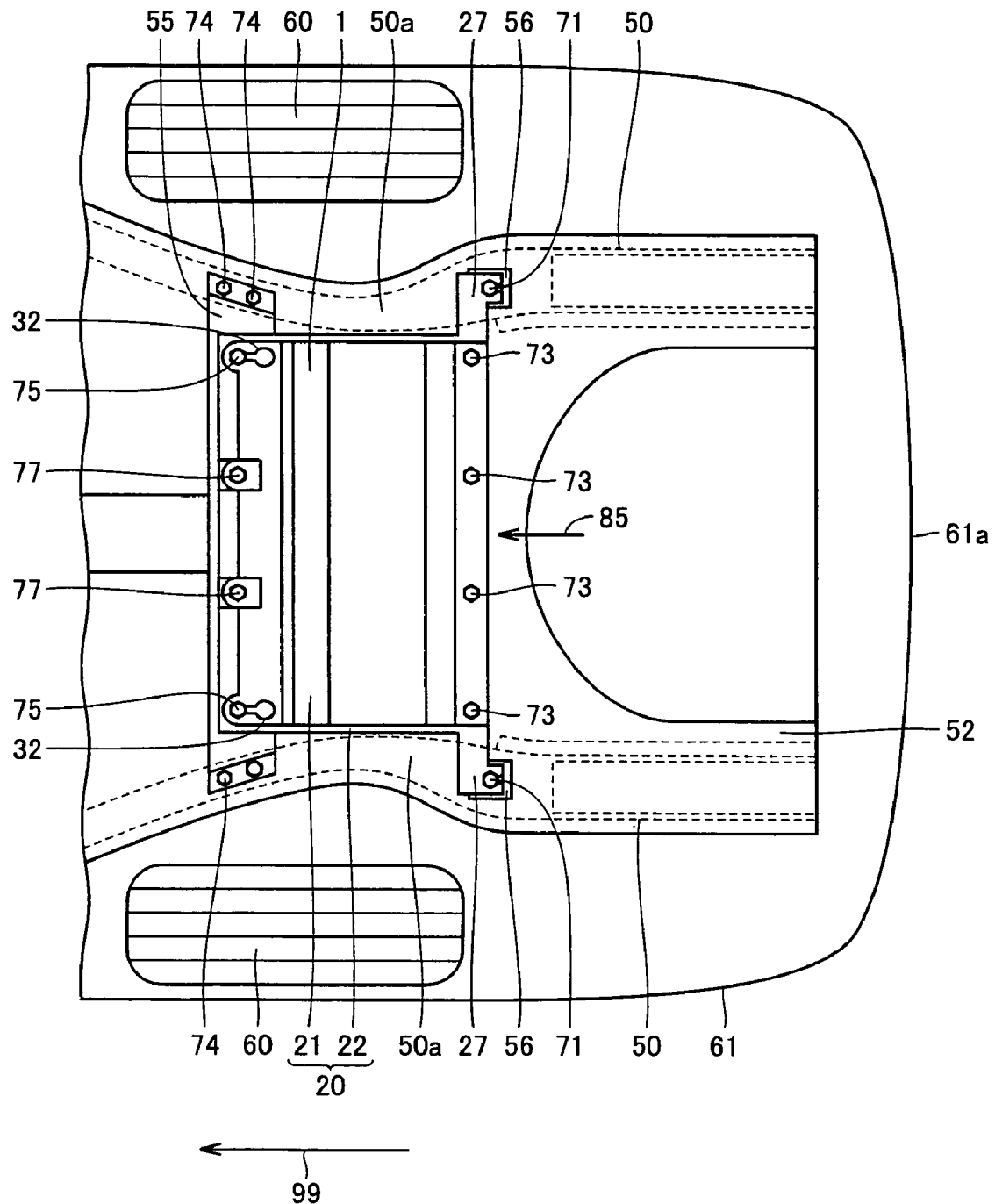
FIG. 15 is a schematic sectional view of a portion of a battery pack in an embodiment 3.
Figure 16:
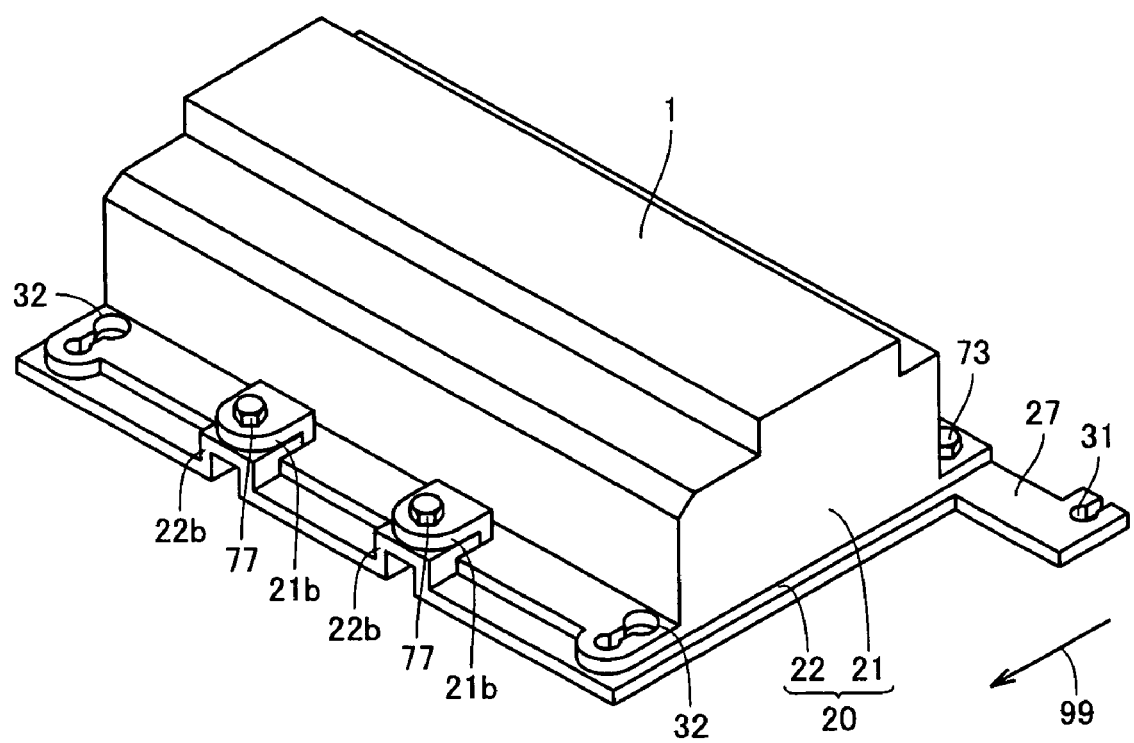
FIG. 16 is a schematic perspective view of the battery pack in Embodiment 3.
Figure 17:
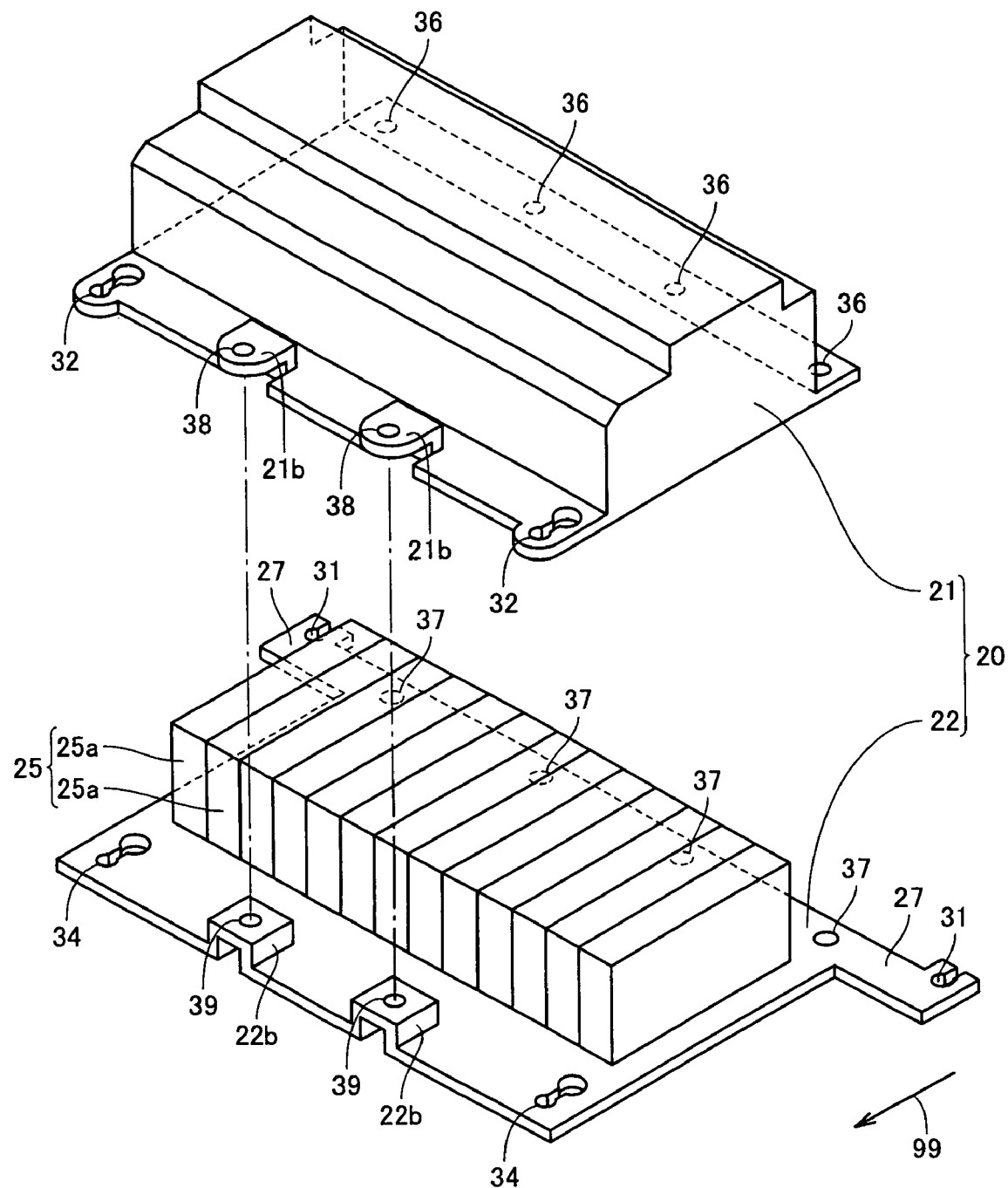
FIG. 17 is a schematic exploded perspective view of the battery pack in Embodiment 3.

With reference to FIGS. 15 to 17, a structure for mounting an electricity storage pack on a vehicle in an embodiment 3 and according to the present invention will be described. The structure for mounting the battery pack on the vehicle in the present embodiment is different from Embodiment 1 in the structure of the front portion of the battery pack.

FIG. 15 is a schematic sectional view of a portion of the battery pack in the present embodiment. At the front end portion of battery pack 1, screw holes 32 are formed on opposite sides in the width direction. By disposing bolts 75 in screw holes 32, the front end portion of battery pack 1 is fixed to mount 55 similarly to Embodiment 1.

Battery pack 1 in the present embodiment has bolts 77 as third screws at its front end portion. Bolts 77 are formed to fix upper case 21 and lower case 22 to each other. Bolts 77 are formed so as not to fix battery pack 1 and mount 55 to each other.

FIG. 16 is a schematic perspective view of the battery pack in the present embodiment. FIG. 16 shows a state in which an impact has been applied on the battery pack and the battery pack has been detached from the side members. Case 20 in the present embodiment is formed so that portions where bolts 77 are to be disposed protrude upward.

Upper case 21 has protruding portions 21b formed to protrude upward from its front end portion. Lower case 22 has protruding portions 22b formed to protrude upward from its front end portion. Protruding portions 21b and protruding portions 22b are formed in positions corresponding to each other. Protruding portions 22b are formed so that nuts for fixing bolts 77 can be disposed inside themselves.

FIG. 17 is a schematic exploded perspective view of the battery pack in the present embodiment. Protruding portions 21b of upper case 21 are formed with screw holes 38 having circular planar shapes. Protruding portions 22b of lower case 22 is formed with screw holes 39 having circular planar shapes. By disposing bolts 77 in screw holes 38 and screw holes 39, upper case 21 and lower case 22 are fixed to each other.

At the rear end portion of battery pack 1, upper case 21 and lower case 22 are fixed to each other by bolts 73 similarly to embodiment 1.

In battery pack 1 in the present embodiment, the front end portion and the rear end portion respectively remain fixed to bolts 73, 77 after the fixed state to the side members has been canceled. Therefore, it is possible to maintain the state in which upper case 21 and lower case 22 are fixed to each other to thereby further reliably prevent damage to the battery pack.

In the present embodiment, the uneven portions are formed at the front portion of the case and the bots and the nuts for fixing the case are disposed at the uneven portions as fixing means for keeping the upper case and the lower case fixed to each other when the battery pack is detached from the side members. The fixing means are not limited to them and it is essential only that the fixing means be formed to fix the case after the electricity storage pack has been detached from the support members. For example, the upper case and the lower case may be fixed at opposite side portions of the electricity storage case.

Because other structures, operations, and effects are the same as those of Embodiment 1, they will not be repeatedly described here.

Embodiment 4

With reference to FIGS. 18 to 22, a structure for mounting an electricity storage pack on a vehicle in an embodiment 4 and according to the present invention will be described. In the structure for mounting on the vehicle in the present embodiment, an impact relaxation means for detaching the electricity storage pack when an impact from an outside high position is applied on the electricity storage pack is formed at support members.

Figure 18:
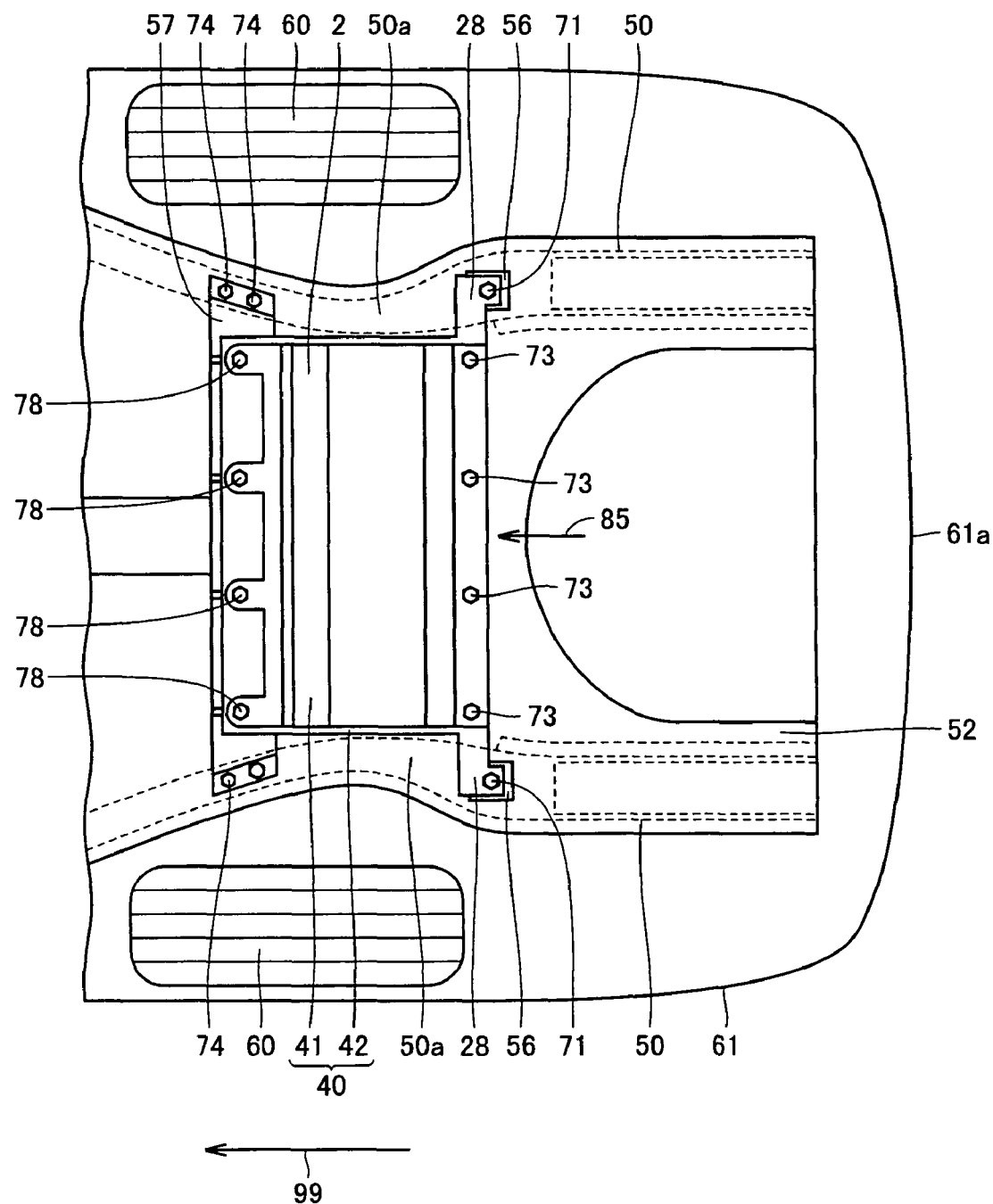
FIG. 18 is a schematic sectional view of a portion of a battery pack in an embodiment 4.

FIG. 18 is a schematic sectional view of a battery pack portion in the present embodiment. An arrow 99 indicates a forward direction of the vehicle body. A battery pack 2 as the electricity storage pack in the present embodiment includes a case 40. Case 40 has an upper case 41 and a lower case 42. Lower case 42 has leg portions 28. Leg portions 28 have the same structures as the leg portions in Embodiment 1.

The support members in the present embodiment include a mount 57. Mount 57 is disposed at a front portion of battery pack 2. A front end portion of battery pack 2 is fixed to mount 57 by bolts 78 as second screws. Moreover, bolts 78 fix upper case 41 and lower case 42 to mount 57. At a rear end portion of battery pack 2, upper case 41 and lower case 42 are fixed to each other by bolts 73.

Figure 19:
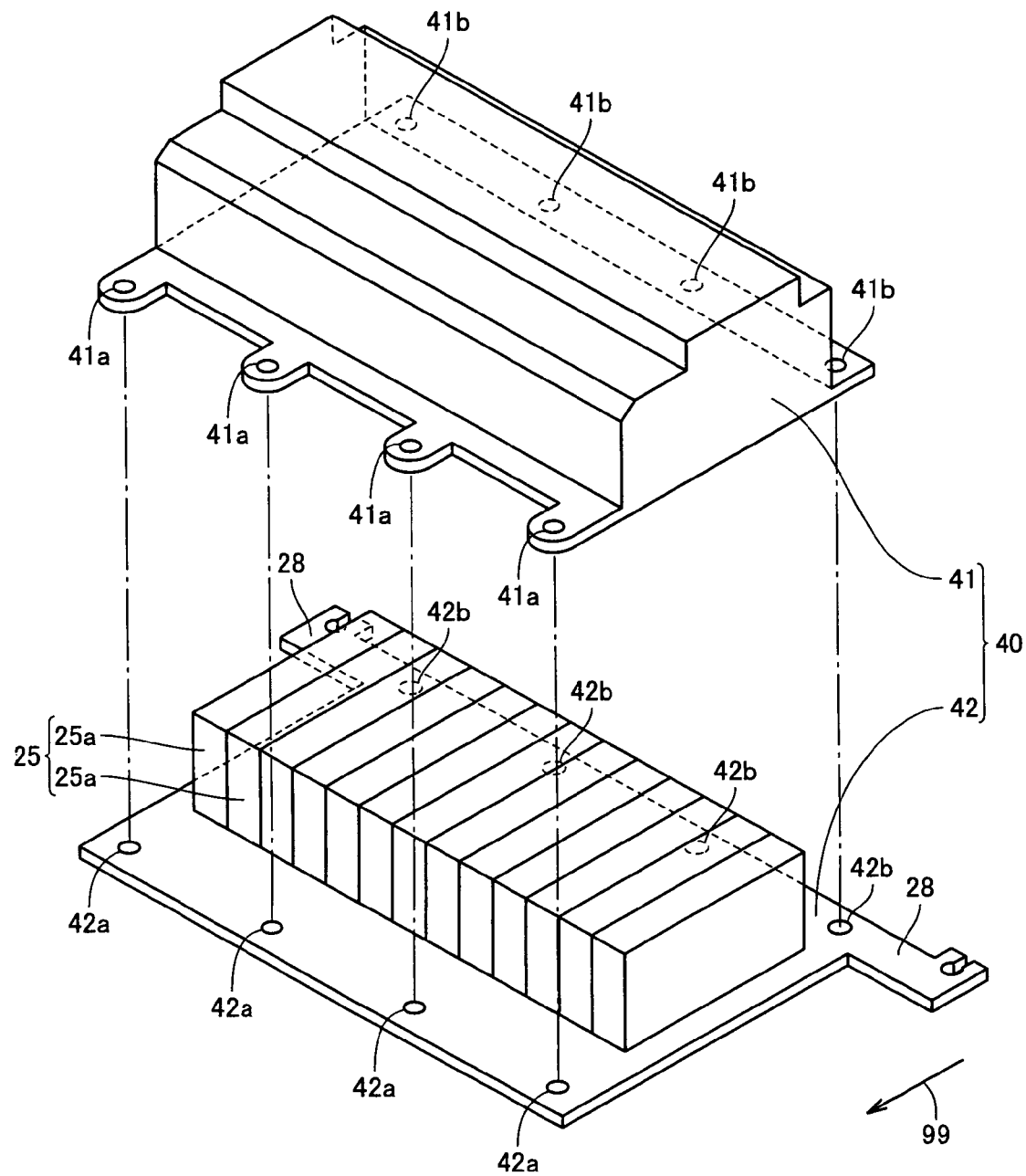
FIG. 19 is a schematic exploded perspective view of the battery pack in Embodiment 4.

FIG. 19 is a schematic exploded perspective view of the battery pack in the present embodiment. A front end portion of upper case 41 is formed with screw holes 41a. Screw holes 41a are formed to have circular planar shapes. Lower case 42 has screw holes 42a at its front end portion. Screw holes 42a are formed to have circular planar shapes. Screw holes 42a are disposed in positions corresponding to screw holes 41a of upper case 41.

Upper case 41 has screw holes 41b at its rear end portion. Lower case 42 has screw holes 42b at its rear end portion. Screw holes 42b are disposed in positions corresponding to screw holes 41b.

With reference to FIGS. 18 and 19, at a front end portion of case 40, bolts 78 are disposed in screw holes 41a, 42a. At a rear end portion of case 40, bolts 73 are disposed in screw holes 41b, 42b. Bolts 73 are fixed by engagement with nuts disposed on a lower face of lower case 42.

Figure 20:
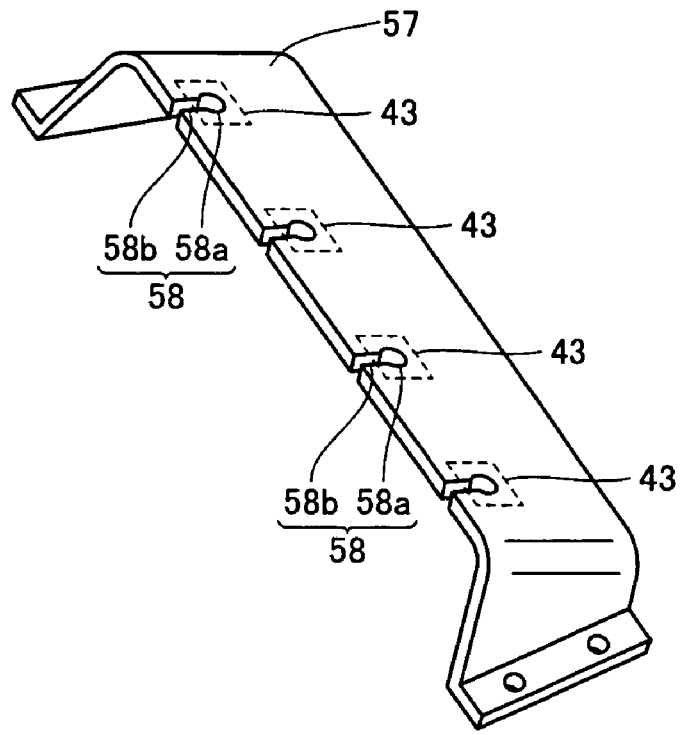
FIG. 20 is a schematic perspective view of a front mount in Embodiment 4.

FIG. 20 is a schematic perspective view of the mount in the present embodiment. Mount 57 has screw holes 58 as second screw insertion holes at its front end portion. Screw holes 58 are formed to extend in the front-rear direction. Screw holes 58 are disposed in positions corresponding to screw holes 41a, 42a of case 40.

Each screw hole 58 has an opening portion 58a and a movement portion 58b. A diameter of opening portion 58a is larger than a diameter of a shaft of bolt 78. The diameter of opening portion 58a is smaller than a diameter of a head portion of bolt 78. A width of movement portion 58b is larger than the diameter of the shaft of bolt 78. An end portion of movement portion 58b is open to an outside.

Support members in the present embodiment include retainers 43 fixed to mount 57. Retainers 43 are disposed on a back side of mount 57 and at portions to be in contact with the battery pack. Retainers 43 in the present embodiment are formed in plate shapes.

Figure 21:
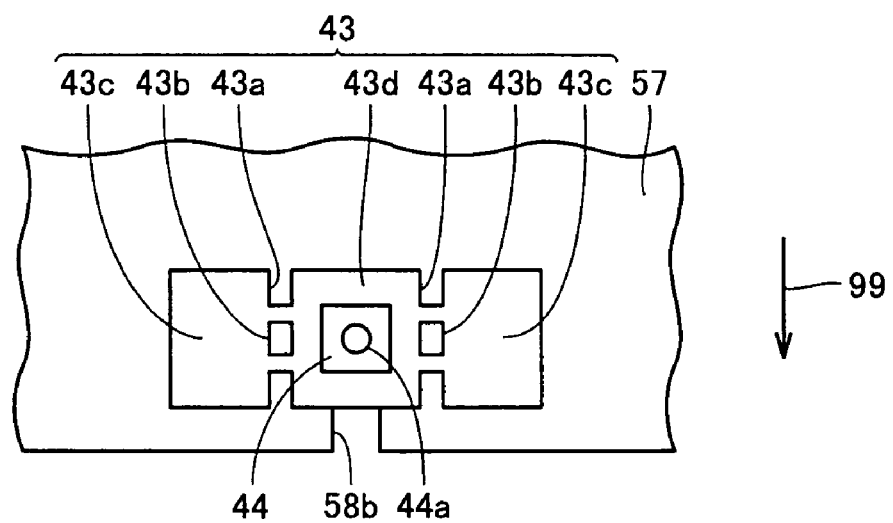
FIG. 21 is an enlarged schematic bottom view of a portion of a retainer of the front mount in Embodiment 4.

FIG. 21 is an enlarged schematic bottom view of the retainer portion when viewed from the back side of the mount in the present embodiment. Each retainer 43 in the present embodiment has breakage assisting portions. Breakage assisting portions are disposed on opposite sides of an insertion hole of retainer 43 and through which the shaft of the bolt is to be inserted. Each of the breakage assisting portions in the present embodiment has notch portions 43a. The breakage assisting portion has a hole portion 43b. Notch portions 43a and hole portion 43b are respectively arranged in the front-rear direction of the vehicle body.

Retainers 43 in the present embodiment are made of metal. Notch portions 43a and hole portion 43b as the breakage assisting portion are formed to correspond to magnitude of the impact from the outside high position at which the battery pack is to be detached from the support members.

Retainer 43 has a central portion 43d and a peripheral portions 43c. Central portion 43d and peripheral portions 43c are divided by notch portions 43a and hole portion 43b. At central portion 43d, a nut 44 for fixing bolt 78 is fixed. Nut 44 has an insertion hole 44a through which the bolt is to be inserted at its central portion. Central portion 43d has the insertion hole corresponding to insertion hole 44a of nut 44 and through which a shaft of bolt 78 is to be inserted.

Retainer 43 is fixed to mount 57 at its peripheral portions 43c. In the present embodiment, retainer 43 is fixed to mount 57 by welding. Nut 44 is fixed to retainer 43 by welding.

With reference to FIG. 18, if an impact from an outside high position is applied on the battery pack 2 as shown by an arrow 85, battery pack 2 moves toward the front side of the vehicle body. Fixed states of leg portions 28 of case 40 to mounts 56 are canceled.

Figure 22:
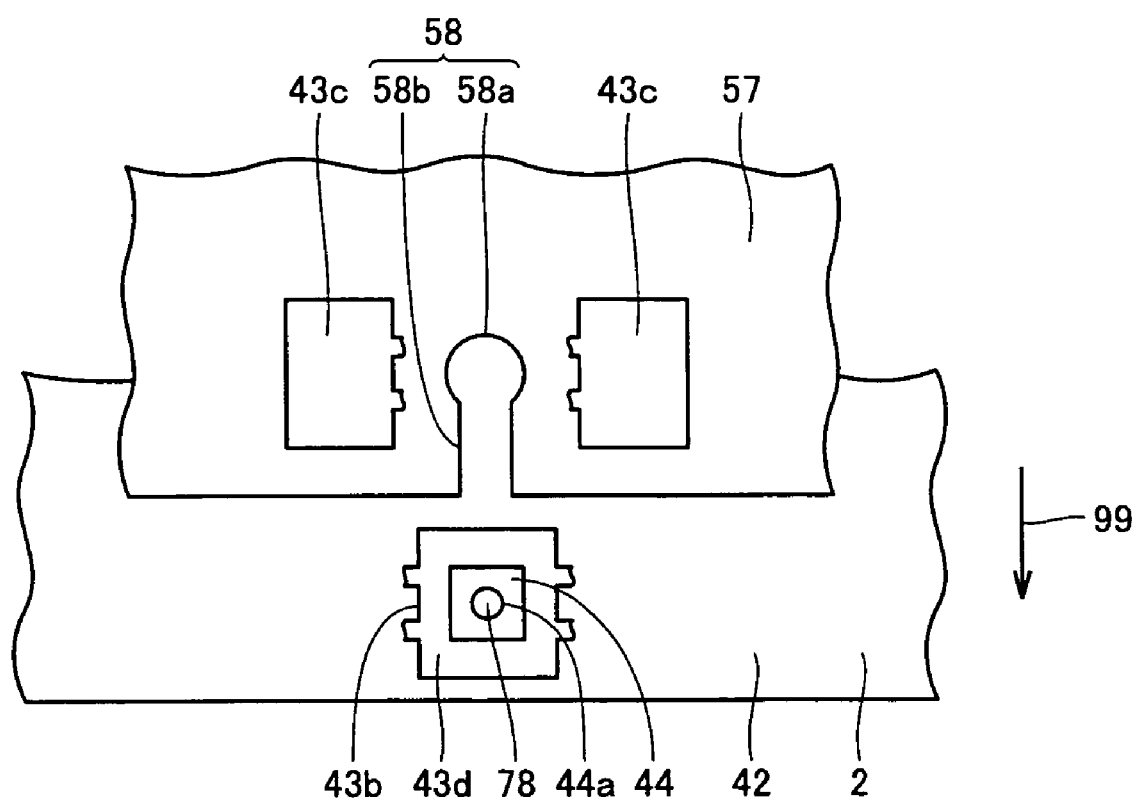
FIG. 22 is an enlarged schematic bottom view of the mount when the retainer is broken in Embodiment 4.

FIG. 22 is an enlarged schematic bottom view of the front mount when the impact from the outside high position is applied on the battery pack. Battery pack 2 moves to the front side of the vehicle body as shown by arrow 99. The retainers are broken at their breakage assisting portions. The retainers are broken at their portions where notch portions 43a and hole portions 43b are formed. At each retainer 43, connections between central portion 43d and peripheral portions 43c are broken. Central portion 43d separates from peripheral portions 43c.

By partial breakage of the retainers, the fixed state of battery pack 2 and mount 57 to each other is canceled. Peripheral portions 43c of the retainers remain fixed to mount 57. Central portions 43d of the retainers are detached together with battery pack 2.

In the present embodiment, if a large truck bumps into the rear of an automobile having the battery pack disposed in its trunk room to apply an impact from an outside high position on the battery pack, the retainers are broken. On the other hand, if an impact applied on the battery pack is small, the retainers are not broken and the battery pack remains fixed to the support members. For example, if a small car bumps into the rear of the automobile to apply such a degree of impact as to deform the support members, the battery pack is formed so as not to be detached. For example, in a case of an impact applied when the automobile collides with a building and a heavy object placed in the trunk room collides with the battery pack, the battery pack is fixed so as not to separate.

Because the support members have retainers and the retainers are broken when the impact from the outside high position is applied as described above, the electricity storage pack is detached from the support members to thereby suppress damage to the electricity storage pack when the impact is applied.

The retainer in the present embodiment has notch portions 43*a* and hole portion 43*b* as the breakage assisting portions. By forming at least one of the notch portions and the hole portion as the breakage assisting portions, it is possible to easily specify the portions where the retainer is to be broken to thereby smoothly break the retainer or it is possible to easily adjust the impact force at which the retainer is to be broken.

The breakage assisting portion is not limited to the notch portions or opening portion. It is essential only that the breakage assisting portions be formed to specify the broken positions of the retainer. For example, in place of the notch portions or the opening portion, thin portions may be formed.

Although the second screw insertion holes in the present embodiment have shapes cut out from the end portion of the mount, they are not limited to these shapes. It is essential only that the second screw insertion hole be formed so that parts of the retainer and the electricity storage pack are integrally detached from the mount after the retainer has been broken. For example, the second screw insertion hole may be formed at a substantially central portion in a width direction of the mount and have a closed shape.

Because other structures, operations, and effects are the same as those of Embodiment 1, they will not be repeatedly described here.

According to the present invention, it is possible to provide the structure for mounting the electricity storage pack on the vehicle and for suppressing damage to the electricity storage pack when the impact from the outside high position is applied on the electricity storage pack.

In the above-described respective drawings, the same or corresponding portions are provided with the same reference numerals.

The above-described embodiments disclosed in the present application are examples in all points and should not be considered restrictive. The scope of the present invention is not defined in the above description but is defined in claims and includes meanings equivalent to the claims and all modifications in the scope of claims.

INDUSTRIAL APPLICABILITY

The present invention can be advantageously applied to an electricity storage pack mounted on an automobile.

The invention claimed is:

1. A structure for mounting an electricity storage pack on a vehicle, the structure comprising a support member for supporting the electricity storage pack, wherein
said electricity storage pack is fixed to an upper side of said support member by a first screw,
said first screw has a shaft portion and a head portion,
said electricity storage pack is disposed on a rear side of a rear seat in the vehicle,
said electricity storage pack includes a first screw insertion hole through which said first screw is inserted,
said first screw insertion hole has a closed shape,
said first screw insertion hole includes:
a first opening portion;
a second opening portion disposed on a rear side of said first opening portion in the vehicle; and
a connecting portion formed to connect said first opening portion and said second opening portion,
said first opening portion is formed to be smaller than said head portion of said first screw,
said electricity storage pack includes a step portion formed in a step shape,
said first screw insertion hole is formed at said step portion,
said second opening portion is formed at a higher portion than said first opening portion,
said second opening portion is formed to be larger than said head portion,
said electricity storage pack moves toward a front side of the vehicle due to movement of said first screw from said first opening portion to said second opening portion when an impact is applied on said electricity storage pack from a rear side of the vehicle, and
as said electricity storage pack moves toward the front side of the vehicle, said head portion of said first screw passes through said second opening portion, and said electricity storage pack is released from said upper side of said support member.

2. The structure for mounting the electricity storage pack on the vehicle according to claim 1, wherein
said electricity storage pack includes a case in which an electricity storage device is disposed,
said case includes:
a lower case on which said electricity storage device is placed; and
an upper case formed to be fixed to said lower case and to cover said electricity storage device,
said lower case and said upper case are fixed to each other by a third screw, and
said third screw is formed so as not to fix said electricity storage pack and said support member to each other.

\* \* \* \* \*